United States Patent [19]

Jaffe

[11] 4,205,430
[45] Jun. 3, 1980

[54] METHOD OF TREATING HIGH ENERGY MAGNETS FOR IMPROVING THEIR PERFORMANCE

[75] Inventor: Wolfgang Jaffe, Roselle Park, N.J.

[73] Assignee: The Singer Company, Stamford, Conn.

[21] Appl. No.: 15,847

[22] Filed: Feb. 27, 1979

[51] Int. Cl.$^2$ ............................................. H02K 15/02
[52] U.S. Cl. ........................................ 29/596; 29/608; 264/24
[58] Field of Search ........................ 29/596, 598, 608; 310/42, 152–156, 23, 24; 264/24

[56] References Cited

U.S. PATENT DOCUMENTS 4,004,167  1/1977  Meckling .............................. 310/154

Primary Examiner—Carl E. Hall
Attorney, Agent, or Firm—Charles R. Lewis

[57] ABSTRACT

When it is not possible to place magnets into their final assembly before magnetizing them, the performance of high energy magnetic materials having a nonlinear demagnetization characteristic at room temperature is improved by heating the magnetic material, magnetizing the heated magnetic material and then placing the resulting heated magnet into its final assembly and letting it cool to room temperature.

6 Claims, 3 Drawing Figures

METHOD OF TREATING HIGH ENERGY MAGNETS FOR IMPROVING THEIR PERFORMANCE

DESCRIPTION

1. Field of the Invention

This invention relates to high energy magnets and more particularly to improving the performance of high energy magnets having a nonlinear demagnetization characteristic at room temperatures.

2. Background of the Invention

Because of the high flux densities which they provide for their size, high energy magnets have found wide use. For example, high energy magnets can be utilized to obtain higher torques from electric motors or they can be utilized to provide smaller sized motors having the same torque as larger motors that do not utilize high energy magnets. As the available flux density increases, however, some high energy magnetic materials have a nonlinear demagnetization characteristic at room temperature. As a result when these magnetic materials are magnetized at room temperature and then placed into their final magnetic circuit or assembly, an undesirable permanent demagnetization takes place. Not only is this loss of flux undesirable per se, but the loss of flux from one magnet to another is so variable that the final flux density can not be accurately determined before hand. Accordingly, such magnets, even though providing high flux densities, are not readily usable. This is particularly true for the many magnetic circuit designs where the final flux density of the magnet is an important consideration to the designer.

Accordingly, one object of this invention is to provide a method of treating high energy magnets for improving their performance.

Another object of this invention is to substantially eliminate the permanent demagnetization of high energy magnetes or subassemblies of such magnets having a nonlinear demagnetization characteristic at room temperatures.

Still another object of this invention is to provide a method of treating high energy magnets, having a nonlinear demagnetization characteristic at room temperatures, to provide predictable final flux densities.

SUMMARY OF THE INVENTION

Briefly described, the method of treating high energy magnets in accordance with the present invention comprises selecting a high energy magnetic material having a nonlinear demagnetization characteristic at room temperature, heating the high energy magnetic material to a temperature where the demagnetization characteristic of the high energy magnetic material is substantially linear, magnetizing the heated high energy magnetic material in a magnetic field to produce a high energy magnet and then placing the resulting heated high energy magnet into an assembly wherein the high energy magnet is to be utilized while the heated high energy magnet is still at a temperature where the demagnetization characteristic is substantially linear. The heated magnet is then allowed to cool to room temperature in the assembly.

BRIEF DESCRIPTION OF THE DRAWINGS

The present invention will be readily understood from the detailed description which follows, taken in conjunction with the attached drawings wherein like reference characters denote like or similar parts through out the several views and wherein.

DETAILED DESCRIPTION OF THE INVENTION

Figure 1:
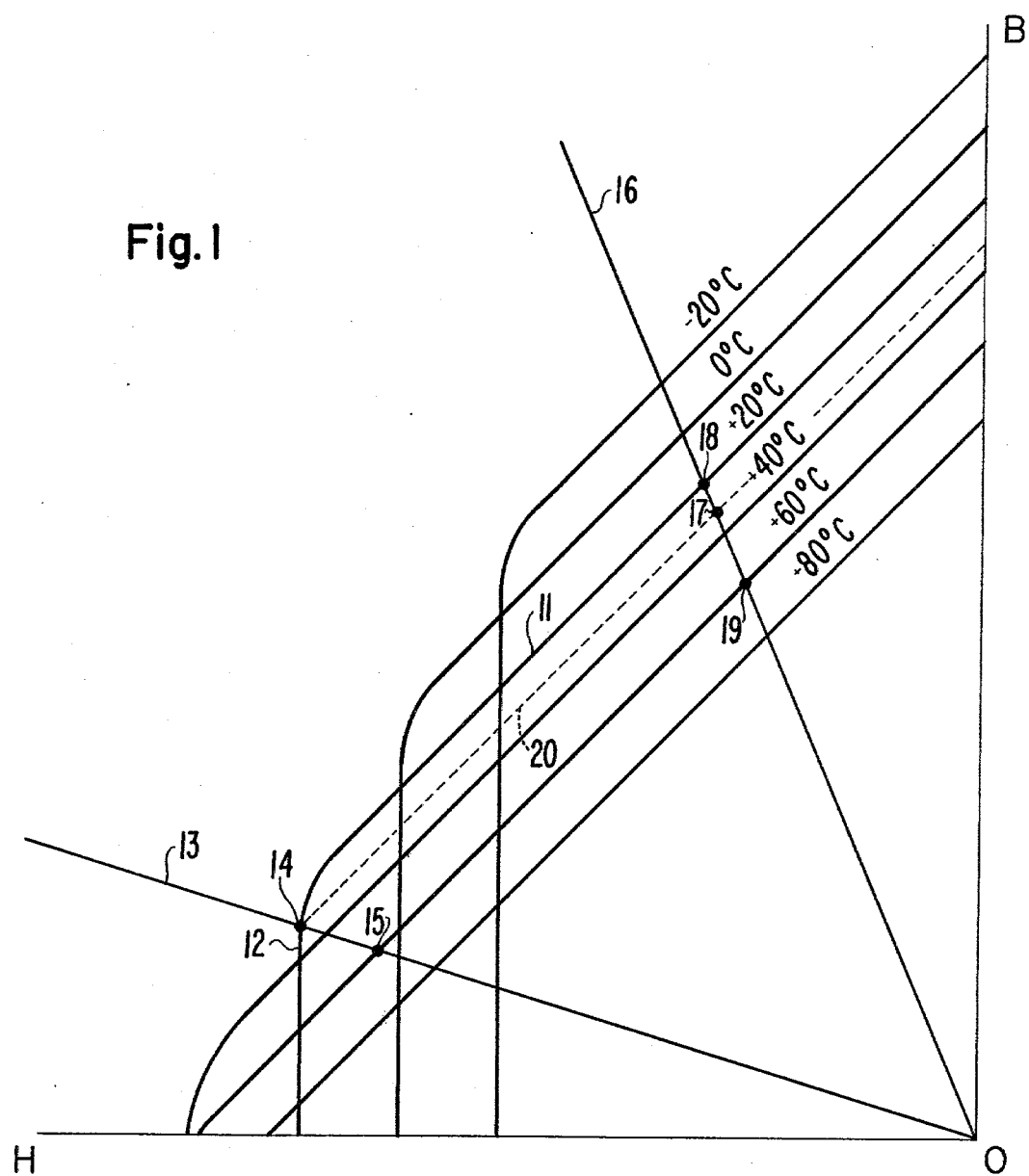
FIG. 1 illustrates demagnetization curves at various temperatures for a typical high energy magnetic material.

The demagnetization curve for various temperatures of a typical high energy magnetic material is illustrated in FIG. 1. In accordance with the present invention a high energy magnetic material is one that contains a ceramic powder base such as ceramic magnets by the Allen-Brad Company and Hitachi and rubber magnets such as the 3M Company 1.4 H material. As shown in FIG. 1, at increasing temperatures beginning above 40 degrees centigrade the demagnetization characteristic is substantially linear. At decreasing temperatures beginning at about 40 degrees centigrade, however, the demagnetization characteristic is nonlinear. For example, at 20° centigrade (approximately room temperature) the upper portion 11 of the demagnetization curve is linear. The lower part of the 20° centigrade characteristic curve, however, contains a knee portion 12 below which the demagnetization characteristic may or may not be linear. As shown, as the temperature continues to decrease the knee occurs at lower values of magnetizing force H.

Line 13 is a typical "open circuit" load line for a high energy magnetic material. This load line 13 corresponds to the high energy magnetic material not being located in the final magnetic circuit in which it is to be used i.e. the high energy magnetic material being in air. As shown, the load line 13 has a relatively small slope and intersects the 20° centigrade demagnetization characteristic curve at or below the knee portion 14 i.e. the nonlinear portion of the demagnetization characteristic curve. The operating point of the high energy magnetic material at 20° centigrade is denoted by reference numeral 14.

Line 16 illustrates a typical operating load line of a typical high energy magnetic material when it is located in the magnetic circuit or assembly in which it is to be utilized. The operating load line 16 has a much greater slope than does the open circuit load line 13. The operating point at 20° C. (approximately room temperature) is denoted by reference numeral 18.

Assume now that a high energy magnetic material having the demagnetization characteristics shown in FIG. 1 is placed into its final magnetic circuit or assembly and has the operating load line 16. The operating point of the high energy magnetic material, at, or near, room temperature is at point 18 along the 20° C. line. If the magnetic material is now magnetized in a unidirectional electromagnetic field, the final flux density B can be determined before hand as there is no permanent demagnetization. However, as is well known to those skilled in the art, it is not always possible to magnetize the high energy magnetic material after it is located in its final or intermediate magnetic circuit or assembly. When this is the case the permanent magnetic material usually must be magnetized in air, i.e., in open circuit conditions as shown by the load line 13. When the high energy magnetic material is magnetized under open circuit conditions at approximately room temperature the operating point is shown at 14. Once magnetized and placed into the final magnetic circuit or assembly the operating point will follow the dotted line 20 until it intersects the operating load line 16 at a new operating point 17 thus creating a "minor loop". the difference between operating point 17 and operating pont 18 represents a permanent demagnetization or loss of flux $\Delta B$. This loss of flux varies from magnet to magnet making it impossible for the designer to determine the final flux density available to him.

The disadvantages setforth hereinabove are eliminated by the present invention by heating the high energy magnetic material, magnetizing the heated high energy magnetic material and placing the resulting heated high energy magnet into the final magnetic circuit or assembly. For example, assume that a high energy magnetic material having an open circuit load line 13 and a closed circuit load line 16 is heated to about 60° C. The operating point is now shown by the reference numeral 15 along the open circuit load line 13. By magnetizing the heated high energy magnetic material with any suitable magnetizer and then placing the resulting heated high energy magnet into the final assembly while still heated, the operating point will follow the 60° C. line until it intersects the operating load line at pont 19. As the heated high energy magnet is allowed to cool in the completed assembly to room temperature, the operating point will follow the operating load line 16 until room temperature is reached, at approximately 20° C., for which the operating point is point 18. As is shown by a perusal of the curves shown in FIG. 1 by thus heating the high energy material before magnetizing it and placing the heated magnetized high energy magnet into the final assembly and allowing the high energy magnet to cool, no permanent demagnetization takes place and there is no loss of flux $\Delta B$.

Figure 2A:
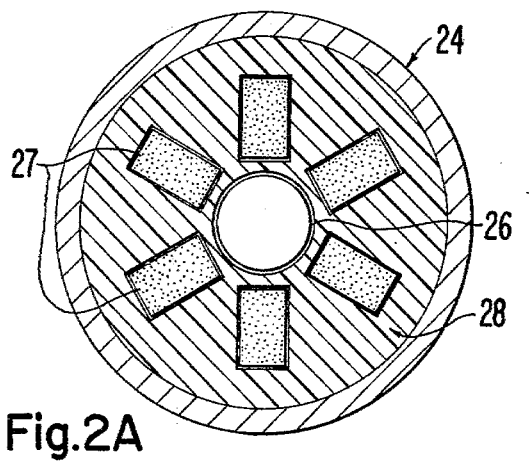
FIGS. 2A and 2B illustrate an electric motor having high energy magnets therein which may be treated in accordance with the present invention.
Figure 2B:
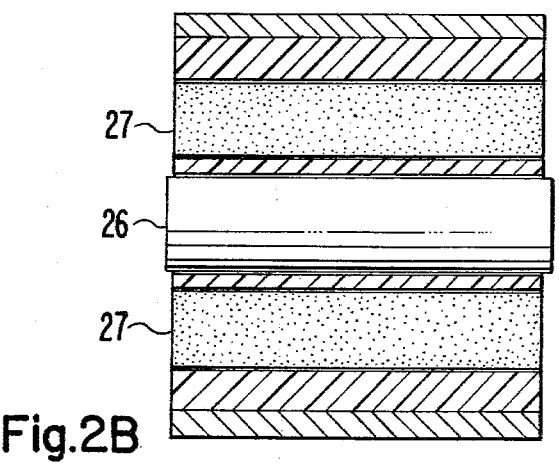

The present invention will be readily understood from consideration of the motor 24 which is illustrated in FIGS. 2a and 2b and which includes a rotor 26 and a stator housing 28 having a plurality of bar magnets 27. This motor is described in detail in U.S. patent application Ser. No. 002,045 filed Jan. 8, 1979 entitled "Linear Motor" the contents of which are incorporated herein by reference. The bar magnets 27 are characterized as powder base ceramic magnets that have a nonlinear demagnetization characteristic at room temperature, as discussed above in conjunction with FIG. 1. The bar magnets 27 are placed into an oven (not shown) where they are heated to a temperature at which their demagnetization characteristic is substantially linear (the 60° C. line in FIG. 1). Once the magnets 27 have reached the proper temperature they are manually removed from the oven with insulated gloves and subjected to a unidirectional electromagnetic field by any suitable magnetizer (not shown) such as a half cycle impulse magnetizer or a capacitor discharge impulse magnetizer. Once magnetized, the heated magnets are manually placed into their final magnetic circuit or assembly, i.e., the stator housing 28 within the motor 24, and allowed to cool to room temperature.

The operation of manually removing the magnets 27 from the oven, magnetizing them and placing them in their final assembly within the motor 24 takes at best only a few minutes. Since it is a characteristic of ceramic powder base magnets that they hold heat well, the heated magnets 27 remain on a linear portion of their demagnetization characteristic until after they are placed into their magnetic circuit or assembly. As they cool, they follow an operating load line (such as the operating load line 16 in FIG. 1) so that when they reach room temperature there is no loss of magnetic flux B, i.e., no permanent demagnetization, and the final flux density is determinable before hand by a designer.

It will be appreciated that this invention will have utility not only with respect to individual high energy magnets, but also in the treatment of subassemblies of such magnets which prior to final assembly would suffer demagnetization that can be prevented by application of the principles of this invention.

The present invention has been described in detail with particular reference to preferred embodiments thereof, but it is to be understood that variations and modifications can be effected within the spirit and scope of the invention as set forth in the claims below.

I claim:

1. A method of treating high energy magnets for improving their performance comprising:
    selecting a high energy magnetic material having a nonlinear demagnetization characteristic at room temperature,
    heating said high energy magnetic material to a temperature where the demagnetization characteristic of the high energy magnetic material is substantially linear,
    magnetizing said heated high energy magnetic material in a magnetic field to produce a high energy magnet, and
    placing said resulting high energy magnet into an assembly wherein said high energy magnet is to be utilized while said high energy magnet is at a temperature where said demagnetization characteristic is substantially linear.

2. The method according to claim 1 further including the step of:
    allowing said high energy magnet in said assembly to cool to room temperature.

3. The method according to claim 1 wherein
    said high energy magnetic material has a ceramic powder base.

4. The method according to claim 1 wherein
    said nonlinear demagnetization characteristic of said high energy magnetic material includes a substantially linear portion and a nonlinear knee portion.

5. The method according to claim 4 wherein
    the open circuit operating point of said high energy magnetic material at room temperature is on said nonlinear portion of said demagnetization characteristic.

6. The method according to claim 4 wherein
    the operating point of said high energy magnetic material at room temperature in said assembly is on said linear portion of said demagnetization characteristic.

* * * * *